United States Patent [19]
Gardner

[11] Patent Number: 5,100,158
[45] Date of Patent: Mar. 31, 1992

[54] COMPLIANT FINGER SEAL

[75] Inventor: James F. Gardner, Exeter, R.I.

[73] Assignee: EG&G Sealol, Inc., Providence, R.I.

[21] Appl. No.: 568,188

[22] Filed: Aug. 16, 1990

[51] Int. Cl.$^5$ .................... F16J 15/16; F16J 15/477
[52] U.S. Cl. ..................... 277/53; 277/152;
277/148; 277/149; 277/192
[58] Field of Search ............. 277/53, 3, 27, 152,
277/148, 149, 212 F, 153, 236, 192, 199, 57,
96.1; 432/115

[56] References Cited

U.S. PATENT DOCUMENTS

| | | | |
|---|---|---|---|
| 3,912,284 | 10/1975 | Gosling et al. | 277/53 X |
| 4,042,248 | 8/1977 | Williamitis | 277/152 X |
| 4,338,080 | 7/1982 | Grandcolas et al. | 432/115 |
| 4,398,725 | 8/1983 | Maegawa | 277/148 X |
| 4,405,137 | 9/1983 | Webb | 277/148 X |
| 4,433,848 | 2/1984 | Williams | 277/152 X |
| 4,750,747 | 6/1988 | Holzer | 277/153 X |
| 4,961,588 | 10/1990 | Brienza | 432/115 X |

FOREIGN PATENT DOCUMENTS 0781518  11/1980  U.S.S.R. ............. 432/115

Primary Examiner—William A. Cuchlinski, Jr.
Assistant Examiner—James K. Folker
Attorney, Agent, or Firm—Finnegan, Henderson, Farabow, Garrett & Dunner

[57] ABSTRACT

A seal for inhibiting the flowing of a gas or liquid in the stream along a shaft within a machine housing, the shaft having an axis of rotation in a predetermined radius, the seal comprising a seal housing attached to the machine housing, and a plurality of fingers extending axially upstream from the seal housing the fingers annularly surrounding the shaft and circumferentially spaced from each other, the fingers extending to contract the shaft when the shaft is not rotating, and the fingers curved in the same direction as the shaft, the radius of curvature of the fingers being greater than the radius of curvature of the shaft. The fingers may be angled away from the direction of rotation, have pockets in the radially inner surface of the fingers, and/or have a plurality of strips extending from the housing radially outside of the fingers and annularly surrounding the shaft, the strips covering the circumferential space between the fingers.

16 Claims, 8 Drawing Sheets

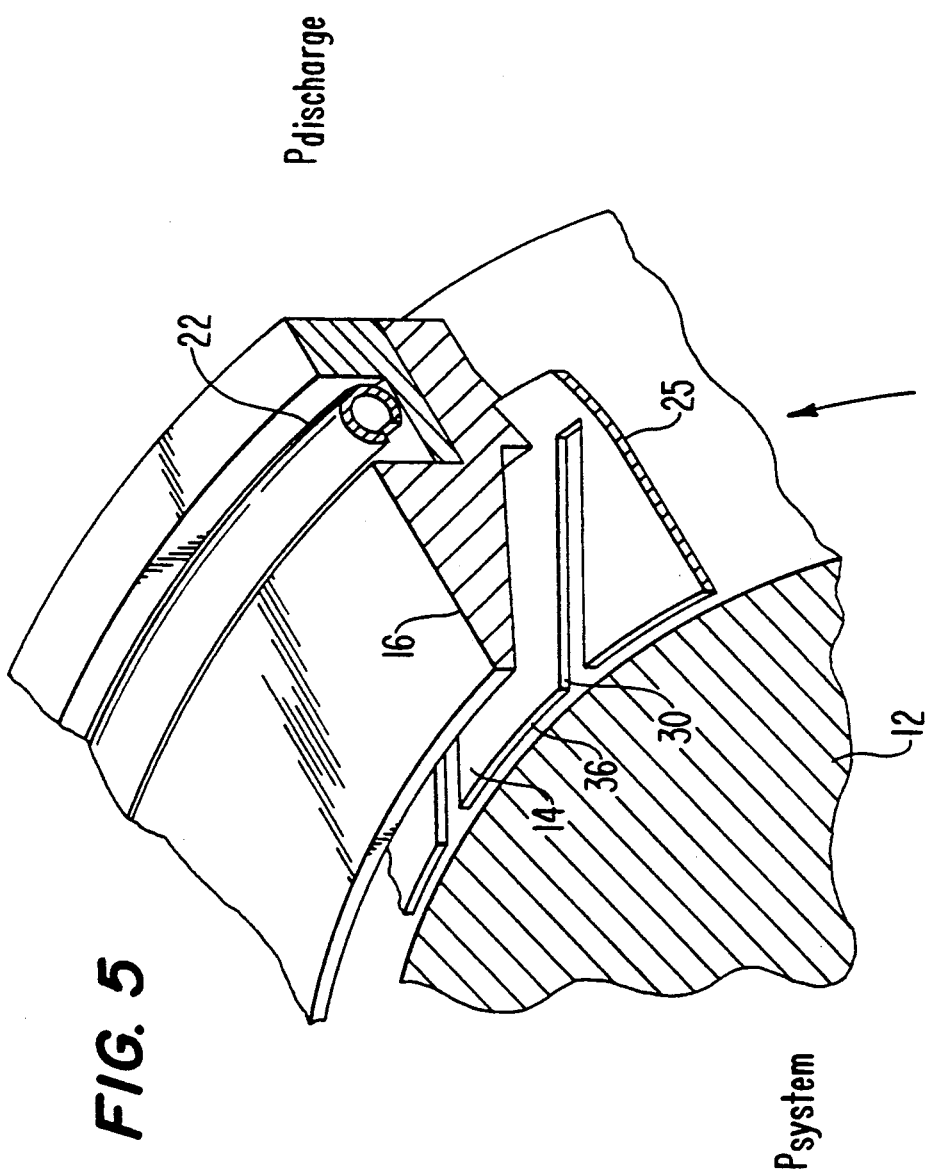

COMPLIANT FINGER SEAL

BACKGROUND OF THE INVENTION

1. Field of the Invention

The present invention relates to a gas or liquid seal having compliant fingers riding on a shaft or other rotary body.

2. Description of the Related Art

Many classes of machinery utilize clearance seals to internally seal against a gas pressure. Often these seals are simple labyrinth seals which break down pressure by using a series of teeth or blades in close proximity to a rotating shaft. Devices such as these are well known and reliable, but allow high rates of gas leakage. Typically, clearances between the blade tips and the shaft are as high as 0.001 to 0.002 inches per inch of shaft diameter.

Much work has been done on reducing the leakage of labyrinth seals. This work has been directed toward improved blade geometry (e.g., backward angled blade designs), step seals, or interlocking blade designs to reduce losses. Particularly on jet engines, abradable seal designs are employed. The blades of such an abradable seal are initially installed with a line-to-line clearance, and then wear in to their own clearance as the machine rotates. However, after the rotor has gone through an operating history of radial vibration combined with axial excursions, the blade cuts a crescent shaped clearance into the abradable seal, and leakage can dramatically increase. Even with improved designs, leakage losses for labyrinth seals represent a considerable energy loss in rotating machinery.

Another significant problem with high pressure labyrinth seals is rotordynamic effects. Since high pressure gas is quite dense, a labyrinth seal begins to act as a bearing, except that it tends to destabilize the rotor since it is out of concentricity with the actual machine bearings. Significant work has been done recently to decrease rotordynamic excitation effects. This work includes swirl breaks in front of labyrinth, reverse swirl inducers, and injecting tangentially non-moving gas into the first stagnant region of the labyrinth. Other work is concentrated on optimized geometry and creating a rough surface within the labyrinth seal to retard circumferential gas velocity buildup. Also, honeycomb design labyrinth seals have been developed to reduce rotordynamic excitation effects. However, further reduction of rotordynamic effects is desirable.

SUMMARY OF THE INVENTION

An object of the invention is to provide an improved gas seal for centrifugal gas compressors, gas turbines, steam turbines, gas expanders and turbo fan jet engines. A further object is to provide a seal having less leakage. A still further object of the invention is to provide improved seal wear characteristics. It is still a further object of the invention to reduce seal rotordynamic effects.

Additional objects and advantages of the invention will be set forth in part in the description which follows, and in part will be obvious from the description, or may be learned by practice of the invention. The objects and advantages of the invention will be realized and attained by means of elements in combinations particularly pointed out in the appended claims.

To achieve the objects and in accordance with the purpose of the invention, the invention comprises a seal for inhibiting the flow of gas in a stream along a rotatable body within a housing, the rotatable body having an axis of rotation and a predetermined radius, the seal comprising a plurality of fingers extending upstream from the housing, the fingers being: annularly positioned around the rotatable body; circumferentially spaced from each other; extended toward contact with the rotatable body when the rotatable body is not rotating; and provided with means for lifting the fingers away from the rotatable body when the rotatable body is rotating.

Preferably, as embodied herein, the lifting means comprising a curvature of the fingers in the same direction as the rotatable body with the radius of curvature of the fingers being greater than the radius of curvature of the rotatable body.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute part of the specification, illustrate several embodiments of the invention and together with the description, serve to explain the principles of the invention.

FIG. 5 depicts a compliant finger seal having angled fingers according to the invention.

DETAILED DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
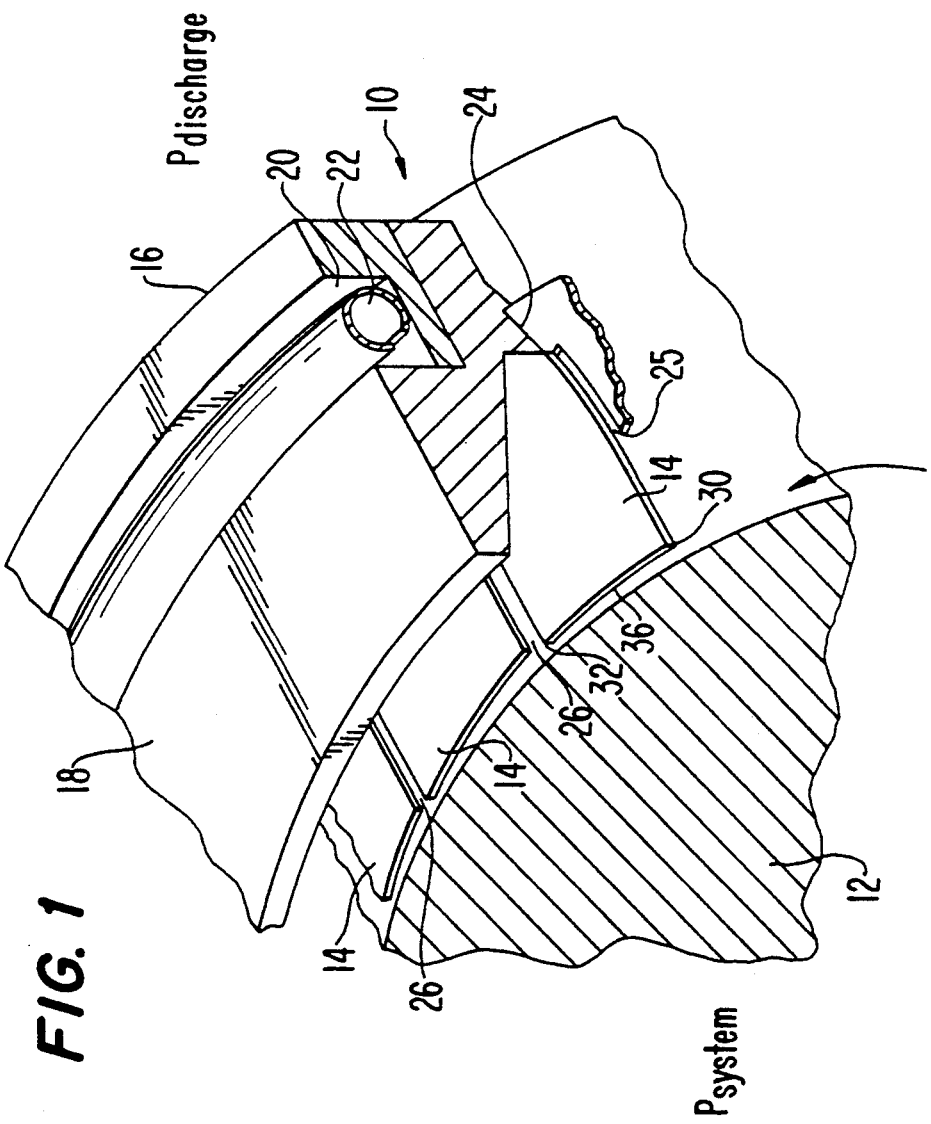
FIG. 1 depicts a compliant finger seal according to the invention.

Compliant finger seal 10 is shown generally in FIG. 1. Such a seal according to the invention inhibits the flow of a gas in a stream along shaft 12. The gas being sealed within the machine housing (not shown) has a pressure of $P_{system}$, and the area outside of the sealed machine housing toward which the sealed gas will tend to leak has a pressure $P_{discharge}$, the pressure $P_{system}$ being greater than $P_{discharge}$.

The seal comprises a plurality of fingers 14 extending axially upstream toward $P_{system}$ from the housing. Preferably, fingers 14 extend from seal housing 16 which is removably attached to the machine housing, as known in the art. Seal housing 16 has axially extending radially outer surface 18 which contacts a mating surface (not shown) in the machine housing. The radially outer surface 18 of seal housing 16 has an annular pocket 20 formed therein. Annular ring seal 22 is placed within pocket 20. Preferably the annular ring seal is a metallic "C" seal, as known in the art.

Seal housing 16 preferably has radially inner portion 24 angled toward shaft 12. Portion 24 is attached to fingers 14, which are metallic, preferably by welding, but may be otherwise attached as known in the art. Angled portion 24 serves to bias fingers 14 toward shaft 12. An optional bend 25 may be placed in fingers 24 to bias them toward the shaft.

The fingers are annually positioned around shaft 12 circumferentially spaced from each other and extended toward contact with the shaft at the ends of the fingers axially away from the housing. The fingers may be made of annealed Inconel 718 or other materials known in the art, and are preferably 0.008 to 0.012 inches thick. Fingers 14 preferably extend to contact shaft 12 at their ends 36, and are sized to optimize the hydrostatic and hydrodynamic characteristics. Currently, for a 4.5 inch shaft and a gas at 25 psi, seals are being tested with a clearance d (see FIG. 2(B)) of 0.020 to 0.030 inches between seal housing 16 and shaft 12, and with fingers 0.425 inches long and 0.25 inches wide. A circumferential space 26 of 0.0005 to 0.0010 inches is placed between the fingers.

Figure 2B:
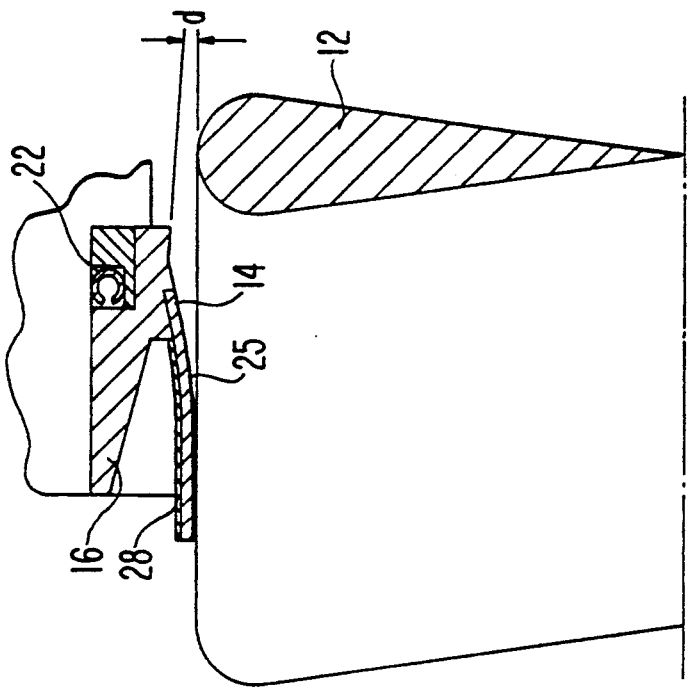
FIGS. 2(A) and 2(B) depict a compliant finger seal having sealing members between the fingers.
Figure 2A:
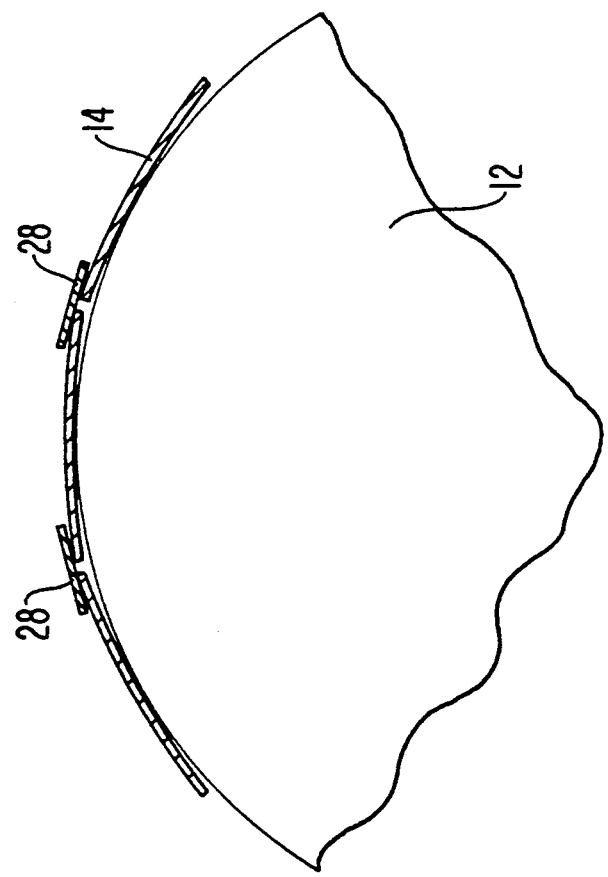

Some gas flow occurs through circumferential space 26 between fingers 14. Although this gas flow is small due to the clearance of only 0.0005 to 0.0010 inches, it may be preferable under certain circumstances to provide additional sealing for the spacing between fingers 14. Such sealing is depicted in FIGS. 2(A) and 2(B). Strips 28, made of a lighter construction than fingers 14, are provided to seal across the very small gap between the fingers. Preferably, strips 28 are made of the same material as the fingers 14, but may be made of other materials such as different alloys. The strips are preferably narrower and thinner than fingers. The strips may also be attached to the seal housing by welding or other means known in the art.

In accordance with the invention, the seal for inhibiting the flowing of gas further comprises means provided on the fingers for lifting the fingers from contact with the shaft when the shaft is rotating. As shown in the preferred embodiment of FIG. 1 by way of example and not limitation, the lifting means is represented by the curvature of fingers 14 in the same direction as the curvature of shaft 12. The radius of curvature of the fingers is greater than the radius of the curvature of the shaft.

During rotating conditions, the curvature mismatch will create ate hydrodynamic lift-off action due to viscous effects of the gas. Under rotating conditions, the lifting means captures gas so that the pressure under the metallic fingers will be increased causing the fingers to bend, and lift-off to occur. The fingers will ride upon a thin film of gas between the fingers and the shaft, thereby making the fingers compliant to tolerances in the surface and rotation of the shaft. As the fingers lift off, they will also twist slightly so that leading edge 30 of each finger 14 will operate at a larger clearance than trailing edge 32. Typical operating clearances at the leading edge of each individual finger are on the order of 0.0003 to 0.0005 inches. Typical clearances at the trailing edge are 0.0001 to 0.00025 inches.

Figure 3A:
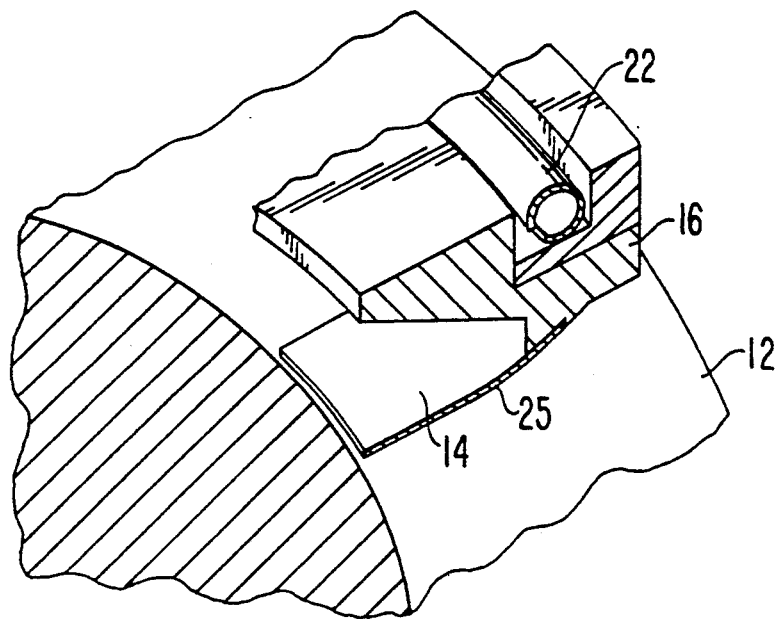
FIGS. 3(A) and 3(B) depict a typical finger, and pressure distribution and flow between the shaft diameter and the underside of a finger.
Figure 3B:
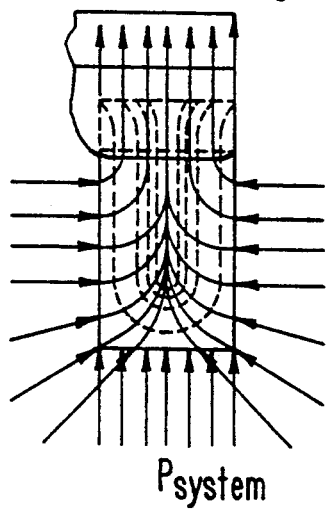

Typical finger 14 is shown in FIG. 3(A). For such a finger, the pressure distribution during non-rotating conditions is shown in FIG. 3(B). The solid lines represent the direction of the flow field of the gas, and the dotted lines represent lines of constant pressure between the shaft and the underside of the compliant members.

Figure 4A:
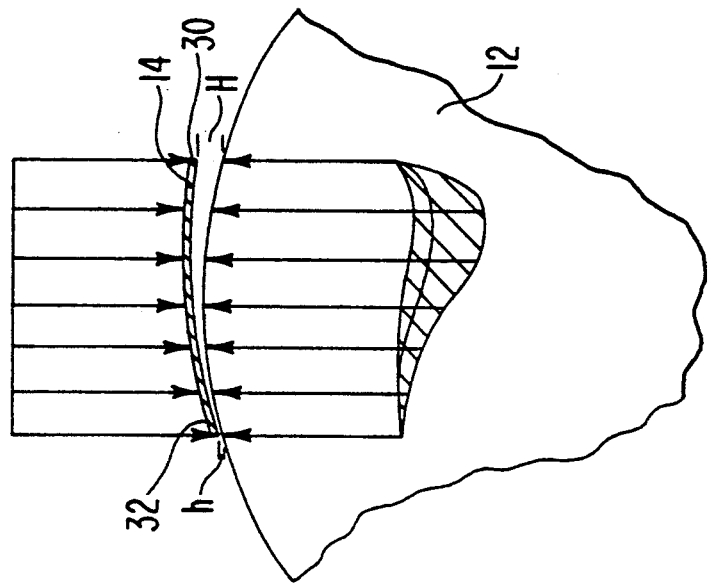
FIG. 4(A) and 4(B) depict a typical pressure distribution around a finger during non-rotation and rotation of the shaft, respectively.

FIG. 4(A) shows a typical pressure profile through the central section of an individual metallic finger during stationary shaft conditions. As can be seen in this Figure, the pressure radially outside the finger is greater than the pressure radially inside the finger. Therefore, the finger is pressed down upon the shaft surface during non-rotating conditions.

Figure 4B:
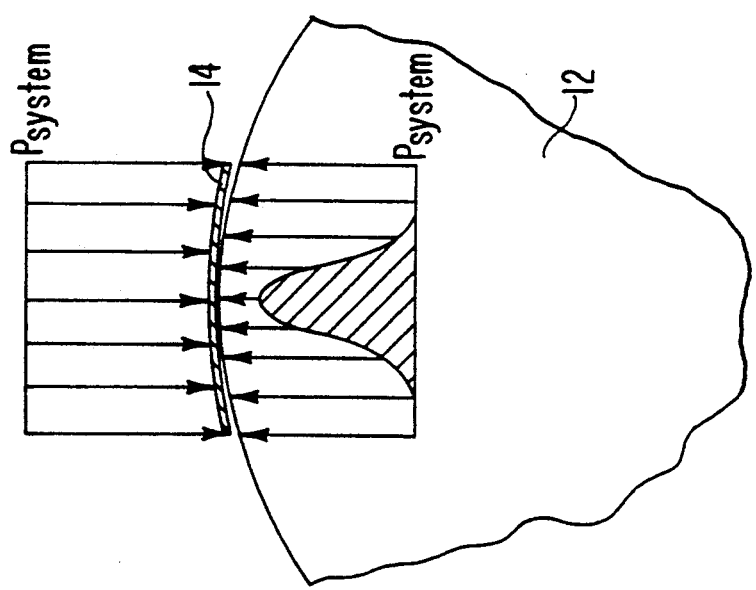

FIG. 4(B) shows a typical pressure distribution through the same section as shaft rotation occurs. At the edge of each finger, pressure is equal to system pressure. Between the finger and the shaft, however, pressure builds up because of viscous shearing effects. A typical pressure distribution under a rotating condition shows that the pressure radially inside the finger is greater than the pressure radially outside the finger and the finger thus lifts from the shaft. As can be seen in the Figure, the pressure under leading edge 30 of the finger is greater than under trailing edge 32. Thus, the clearance (H) at the leading edge is greater than the clearance (h) at the trailing edge.

The embodiment shown in FIGS. 1, 2, 3 and 4 are preferably used at relatively low pressure (typically 25 to 75 Psia), high temperature (800°–1600° F.), and high speed (typically 600–1200 feet per second) conditions usually found in jet engine seal locations.

Another embodiment of the invention uses angled fingers 14 to augment the lift-off for a preferred direction of rotation. This embodiment is shown in FIG. 5. In FIG. 5, the fingers have their elongated axis angled with respect to the axis of the shaft so that the ends 36 of fingers 14 face away from the direction of rotation. As the shaft rotates, the angling causes capture of gas not only from leading edge 30 but also from the fact that the finger is partially wrapped over the shaft diameter, and acts like a "foil bearing". The increased pressure causes additional lift-off and clearance of the finger from the shaft.

Figure 6A:
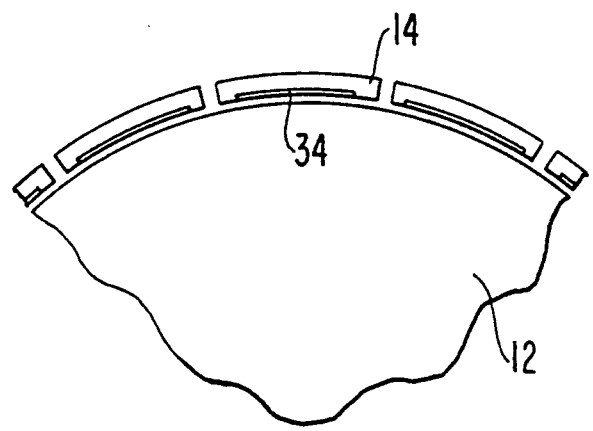
FIGS. 6(A), 6(B) and 6(C) depict a compliant finger seal according to the invention with pockets formed in the fingers.
Figure 6B:
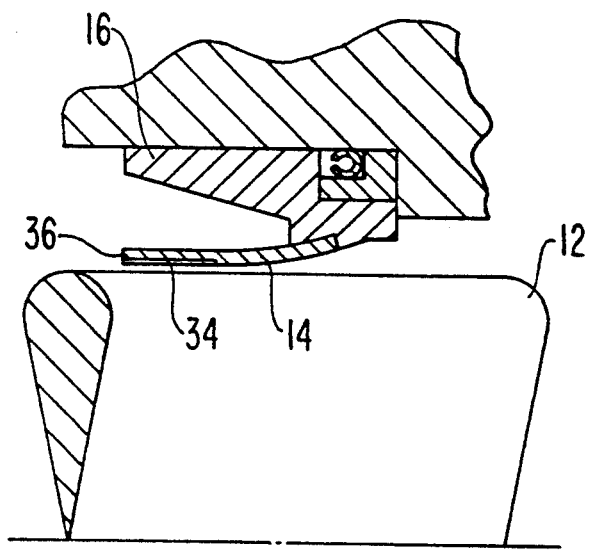
Figure 6C:
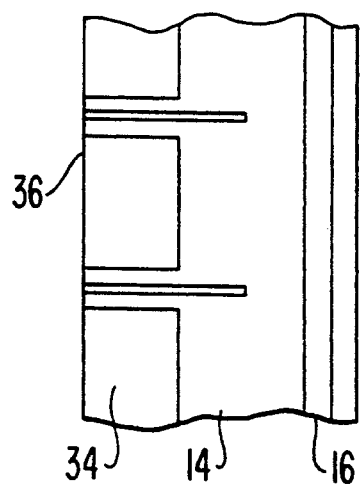
Figure 8:
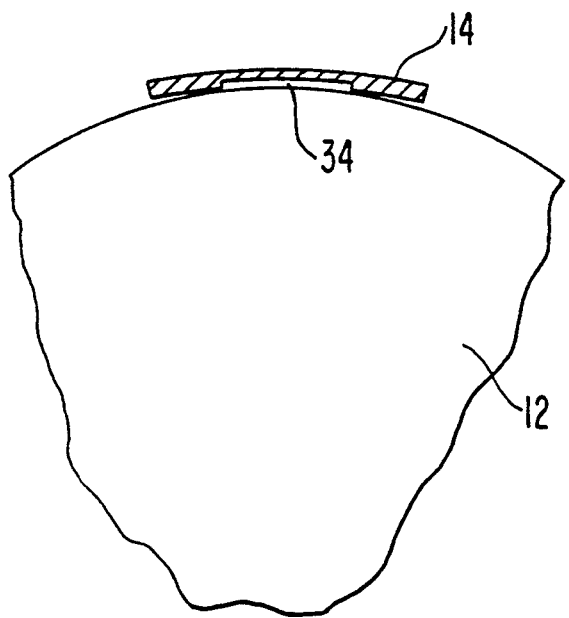
FIG. 8 depicts an embodiment of the seal having a pocket and a mismatch in curvature between the finger and the shaft.

A further embodiment of the invention is shown by FIG. 6. This configuration increases the pressure range of the seal by pressure balancing pocket 34 in finger 14. Pockets 34 may be chemically milled, ion etched or made by other means known in the art. These pockets increase lift-off by incorporating step bearing principles, similar to Raleigh pad designs on face seals. Other lift-off geometry may also be used such as angled grooves pumping against a fixed dam region beneath the finger. Since in this embodiment the pockets provide the hydrodynamic lift, a mismatch in curvature between the shaft and the finger is not required for hydrodynamic lift-off. Therefore, finger 14 and shaft 12 preferably have the same radius of curvature, although the finger may have both a pocket and a mismatch in curvature between the finger and the shaft, as shown in FIG. 8.

As shown in FIG. 6, a pocket according to the invention is typically 0.0003 to 0.0005 inches deep in a 0.006 to 0.012 inch thick metallic finger. Pockets 34 extend to ends 36 of fingers 14 adjacent to $P_{system}$ and allows the system pressure to enter underneath the end of the finger thereby creating a hydrostatic balancing force which creates an additional lifting force.

Figure 7:
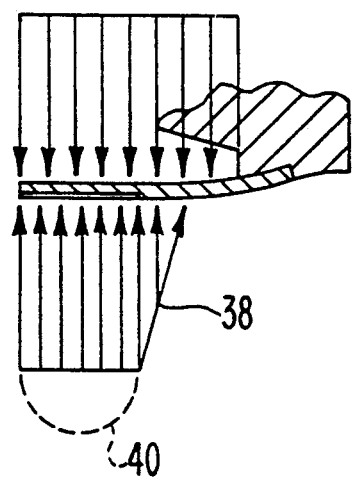
FIG. 7 depicts a pressure distribution around a finger as occurs in a seal as depicted in FIGS. 6(A), 6(B) and 6(C).

FIG. 7 shows a pressure distribution during non-rotating conditions consisting of a hydrostatic balance force 38. Additional hydrodynamic lift-off 40 due to tangential velocity of the gas along the rotating shaft is caused by shaft rotation.

A seal according to any of the embodiments of the invention shows improved sealing compared to prior art labyrinth seals. Additionally, the compliant metallic shaft riding seals show very small rotordynamic excitation. The individual fingers are of thin, compliant, metallic construction, and are quite soft in radial direction so direct stiffness and cross coupled stiffness of the seal are quite low. Therefore, the seal should transmit minimum forces to the rotating shaft. Therefore, such a seal should be ideal for rotating machinery including centrifugal gas compressors, gas turbines, steam turbines, gas expanders, and turbo fan jet engines.

The seal sizes for such units may range from less than 1 inch to up to several feet in diameter, and the pressure may range from 25 psig to as high as 500 psig. Temperatures for these machines may be as high as 1500° F. with surface speeds as high as 1200 feet per second. Preliminary testing has shown that a compliant finger seal according to the invention has approximately one half the leakage of a close tolerance labyrinth seal when sealing a 25 psig gas.

It will be apparent to those skilled in the art the various modifications and variations can be made to the improvements of the present invention and in construction of the seal without departing from the scope or spirit of the invention.

Other embodiments of the invention will be apparent to those skilled in the art from consideration of the specification and practice of the invention disclosed therein. It is intended that the specification and examples be considered as exemplary only, with a true scope and spirit of the invention being indicated by the following claims.

What is claimed is:

1. A seal for inhibiting the flowing of fluid in a stream along a rotatable body within a housing, the rotatable body having an axis of rotation and a predetermined radius, the seal comprising a plurality of fingers extending axially upstream from the housing, the fingers being:
    annularly positioned around the rotatable body;
    unconnected to and circumferentially spaced from each other at their upstream end;
    extended toward contact with the rotatable body when the rotatable body is not rotating; and
    provided with means, responsive to the rotation, for lifting the fingers away from the rotatable body when the rotatable body is rotating.

2. A seal for inhibiting the flowing of fluid in a stream along a rotatable body within a housing, the rotatable body having an axis of rotation and a predetermined radius, the seal comprising a plurality of fingers extending axially upstream from the housing, the fingers being:
    annularly positioned around the rotatable body;
    circumferentially spaced from each other;
    extended toward contact with the rotatable body when the rotatable body is not rotating; and
    curved in the same direction as the rotatable body, the radius of curvature of the fingers being greater than the radius of curvature for the rotatable body, for lifting the fingers away from the rotatable body when the rotatable body is rotating.

3. The seal as claimed in claim 1, wherein the fluid being sealed has a system pressure $P_s$ which is greater than the downstream discharge pressure $P_d$, the pressure $P_s$ existing radially outside of the fingers and the average pressure existing radially inside the fingers being less than $P_s$ when the rotatable body is not rotating, and wherein the lifting means creates a pressure greater than $P_s$ radially inside the fingers when the rotatable body is rotating.

4. The seal as claimed in claim 2, wherein the fingers have an elongated axis in the axial direction and wherein the elongated axis of the fingers is angled with respect to the axis of the rotatable body such that the ends of the fingers proximate the rotatable body extend away from the direction of rotation.

5. The seal as claimed in claim 1, wherein the lifting means comprises pockets in the radially inner surface of the fingers.

6. The seal as claimed in claim 5, wherein the pockets are in fluid communication with the fluid upstream of the fingers.

7. The seal as claimed in claim 1, further comprising a plurality of strips extending from the housing, the strips radially outside of the fingers and annularly surrounding the rotatable body, the strips covering the circumferential space between the fingers.

8. A seal for inhibiting the flowing of a fluid in a stream along a shaft within a machine housing, the shaft having an axis of rotation and a predetermined radius, the seal comprising:
    a seal housing attached the machine housing; and
    a plurality of fingers extending axially upstream from the seal housing, the fingers annularly surrounding the shaft and circumferentially spaced from each other, the fingers extending to contact the shaft when the shaft is not rotating, and the fingers curved in the same direction as the shaft, the radius of curvature of the fingers being greater than the radius of curvature of the shaft.

9. The seal as claimed in claim 8, wherein the fingers are angled with respect to the axis of the shaft such that the ends of the fingers proximate the shaft extend away from the direction of rotation.

10. The seal as claimed in claim 8, wherein the fingers include pockets in the radially inner surface of the fingers.

11. The seal as claimed in claim 8, further comprising a plurality of strips extending from the housing, the strips radially outside of the fingers and annularly surrounding the shaft, the strips covering the circumferential space between the fingers.

12. The seal as claimed in claim 8, further comprising means for sealing between the machine housing and the seal housing.

13. The seal as claimed in claim 12, wherein the seal housing has a radially outer surface for mating with the machine housing, and wherein the sealing means comprises an annular pocket in the radially outer surface of the seal housing and an annular ring seal in the pocket.

14. The seal as claimed in claim 13, wherein the annular ring seal is a metallic "C" seal.

15. The seal as claimed in claim 8, wherein the fingers are metallic.

16. The seal as claimed in claim 15, wherein the fingers are welded to the sea housing.

* * * * *

UNITED STATES PATENT AND TRADEMARK OFFICE
CERTIFICATE OF CORRECTION

PATENT NO. : 5,100,158
DATED : March 31, 1992
INVENTOR(S) : James F. Gardner

It is certified that error appears in the above-identified patent and that said Letters Patent is hereby corrected as shown below:

ON THE TITLE PAGE

In the Abstract, Line 8, change "contract" to --contact--.

In Claim 16, Column 6, Line 67, change "sea" to --seal--.

Signed and Sealed this

Eighth Day of June, 1993

Attest:

MICHAEL K. KIRK

Attesting Officer     Acting Commissioner of Patents and Trademarks